J. A. Bassett.
Carburetor
No. 3,124. Reissued Sept. 15, 1868.
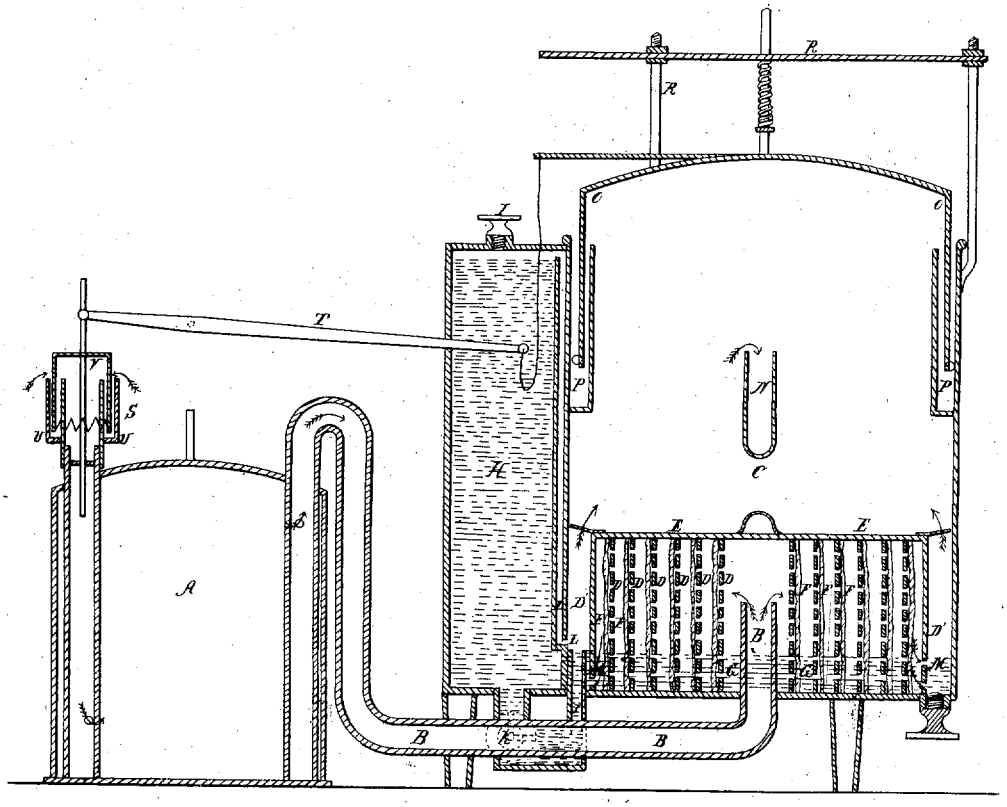
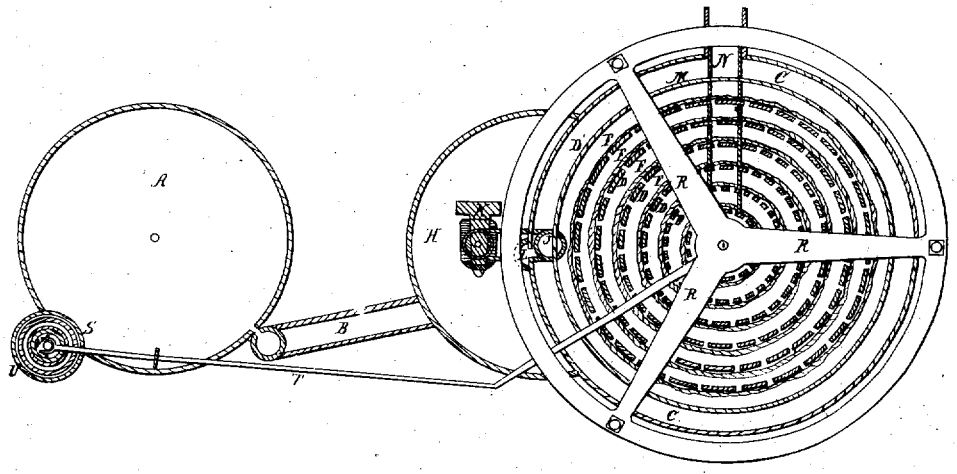
Witnesses
M. B. Mansfield
T. B. Russell.
Inventor
John A. Bassett

UNITED STATES PATENT OFFICE.

JOHN A. BASSETT, OF SALEM, MASSACHUSETTS.

IMPROVEMENT IN APPARATUS FOR CARBURETING AIR OR GASES.

Specification forming part of Letters Patent No. 46,771, dated March 14, 1865; Reissue No. 3,124, dated September 15, 1868.

*To all whom it may concern:*

Be it known that I, JOHN A. BASSETT, of Salem, in the county of Essex and State of Massachusetts, have invented a new and useful Improvement in Apparatus for Carbureting Air or Gases; and I do hereby declare that the following is a full, clear, and exact description of the same, reference being had to the drawings accompanying this specification.

The nature of my invention consists in the arrangement and construction of a carbureting apparatus, by means of which the air to be carbureted is caused to come in contact with the hydrocarbon liquid in finely-divided streams, so that each particle of air may be brought into intimate contact with the hydrocarbon vapor; and in the arrangement of the carbureting-surfaces so that this operation is successively repeated, each time increasing the surface, so that the air may be gradually charged with an increasing amount of vapor until it is saturated.

It also consists in enveloping one or a series of perforated diaphragms with a fibrous material possessing the greatest amount of capillary power in the direction of its length, through and over which the air passes to be carbureted.

It also consists in controlling the action of the air-pump or air-forcing apparatus by which the air is caused to enter the carbureter, so that the quantity required to keep the holder at the proper height may be admitted and regulated.

It also consists in placing the carbureting apparatus in a gas-holder tank, with a water-seal, independent of the hydrocarbon liquid.

To enable others skilled in the art to make and use my invention, I will proceed to describe the means by which I have successfully carried it into effect.

In the drawing, Figure 1 is a sectional view, and Fig. 2 a plan, of the apparatus used.

Similar letters of reference indicate like parts in both figures.

The air to be impregnated with hydrocarbon vapor is forced into the carbureter by the pump A, which consists of the dry meter used for measuring gas, adapted to this purpose, and which may be actuated by any of the motors in use. From the pump A the air is forced, through the pipe B, into the carbureting-chamber C. A series of concentric diaphragms or cylinders, D, made of perforated tin or zinc plate or other suitable material, are arranged around the inlet-pipe B (the opening of which is above the level of the hydrocarbon liquid) at regular distances apart. These diaphragms are covered by a plate, E, at the top, and attached to them, making a gas-tight joint at the top. These diaphragms are covered with a textile fabric, F, woven for this purpose, the filling of which is made of large, loose threads of long fiber, having great capillary power. This fabric is stretched tight over the cylinders, and the air passes through them successively. The hydrocarbon liquid G is maintained at a constant level in the chamber by means of a reservoir, H, which is filled at the opening I, and which passes into the carbureter by means of the pipe J. A stop-cock, K, is placed in this pipe, and when the reservoir is to be filled this cock is shut. After it is full the cap I should be closed air-tight. The stop-cock K is then opened, and the hydrocarbon liquid will flow in and fill the carbureter up to and covering the opening L, which communicates with a pipe reaching above the level of the liquid in the reservoir. When this opening is covered the supply will be stopped until, by the exhaustion of the liquid below the level of this opening, air is admitted to the reservoir, and it is again supplied, and thus a constant level is maintained.

The outer cylinder D of the series D is not perforated, except near the bottom, where there is a ring of small openings, M, about a quarter of an inch below the level of the liquid. The air passes through these openings below the level of the liquid, bubbling out into the chamber, thus completing the carbureting process. It then passes out at the outlet-pipe N to the burners.

A constant pressure is maintained upon the gas by the use of the holder O, which moves in the water-seal P, and is guided by the frame R.

The rise and fall of the holder are controlled by the mercury-valve S, which is attached, by the lever and cord T, to the rod on the top of the holder. When the holder rises as high as is desired, the lever is raised, depressing the cap V, which throttles the supply of air until the holder is lowered by the use of the gas, when the lever drops, the valve opens, and thus a regular supply of air is maintained in proportion to the amount used, and the holder is prevented from rising against the frame R, which would render the light unsteady by varying the pressure, or the lower edge would unseal, allowing an escape of gas.

The valve consists of an annular cup, U, filled with mercury. A cap, V, having the lower edge serrated, is inverted over the cup, and attached, by the rod, to the lever and cord. The arrows show the direction of the currents of air and gas.

The object in view in this invention is the regular, progressive, and uniform carburation of the air. It is entirely automatic in its action, the gas being made only as used. As the air passes through the first of the series of cylinders it receives a very slight carburation. At the next cylinder the streams of air are again divided and strained. This process is repeated, with a constantly-increasing surface, until the air is thoroughly carbureted. It is obvious that the spaces between the cylinders may be entirely filled with a capillary material and the same result attained.

The carbureter is placed in the gas-holder tank, so that it may be readily taken out for examination by removing the holder; and, by having a separate seal for the holder, a very small quantity of liquid is required when it is desirable to use glycerine, or some other material not liable to freeze, when the apparatus is exposed to cold.

Having thus described my invention, I shall state my claim as follows:

1. The general arrangement and construction of the apparatus, consisting of the several parts shown and described.

2. The carburation of air or gases by the use of perforated plates or cylinders, with the fibrous material partially immersed in the hydrocarbon liquid, substantially in the manner as set forth and shown.

3. The automatic regulation of the air to be admitted to the holder and carbureter by means of a valve connected with, and operated by, the holder through the lever and cord, or their equivalents when used for this purpose, as shown and specified.

4. A carbureting device placed in the gas-holder tank, in the manner substantially as described.

5. A carbureting device for enriching air or gases with the vapor of a volatile hydrocarbon, placed in a gas-holder tank, having a seal for the holder independent of the level of the hydrocarbon liquid.

6. The combination of a device for carbureting air or gases, using capillary materials, with the method of carbureting by forcing the air or gases through the hydrocarbon.

7. The automatic reservoir for replenishing the hydrocarbon liquid in the carbureting-chamber, in combination with a gasometer, substantially as shown and described.

8. The use of a mercury-valve for controlling the admission of air to the carbureting-chamber, as set forth and shown.

9. Forcing air or gas through hydrocarbon liquid, or through capillary materials charged with such liquid, within a gas-holder, so as to carburet or enrich the same, substantially as described.

10. The combination of a gas-holder, a vessel to contain hydrocarbon liquid within the gas-holder, and an air or gas forcing apparatus, substantially as described.

J. A. BASSETT.

Witnesses:
A. MOORE,
D. P. COWL.